Patented Apr. 19, 1932

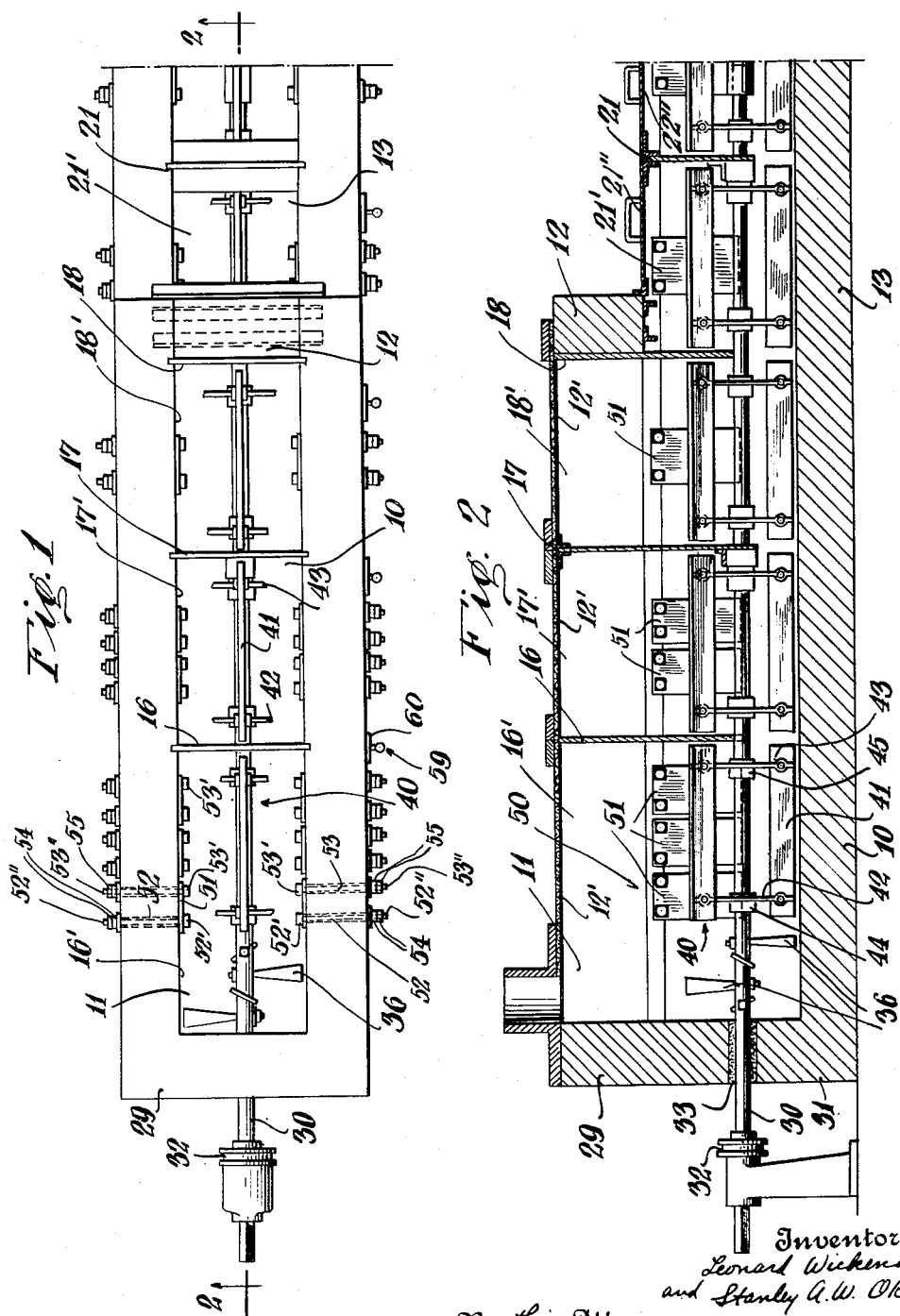

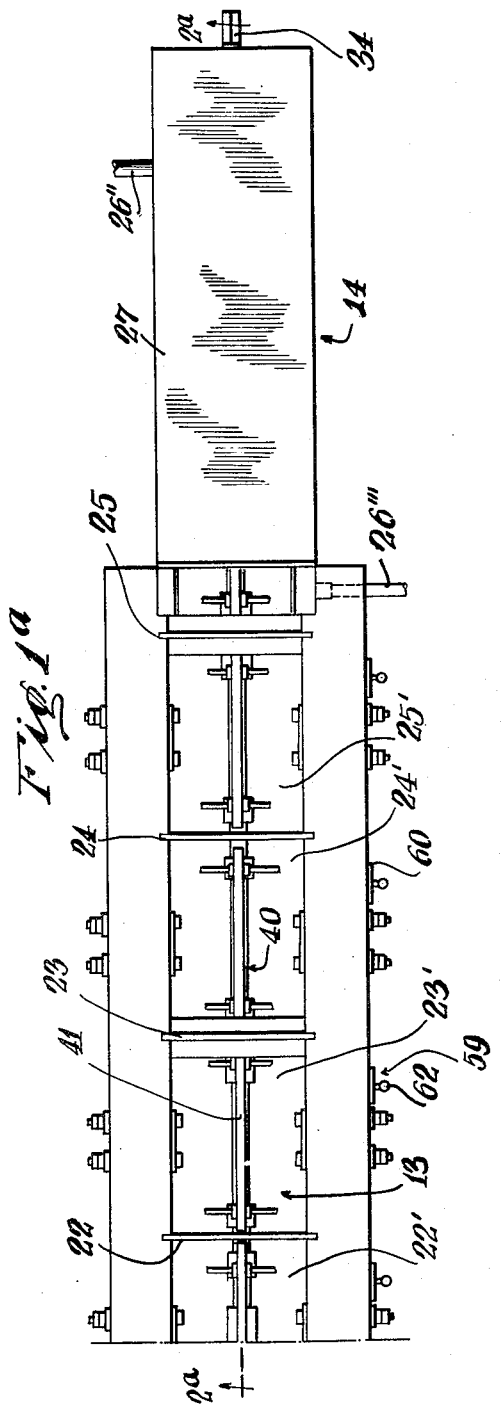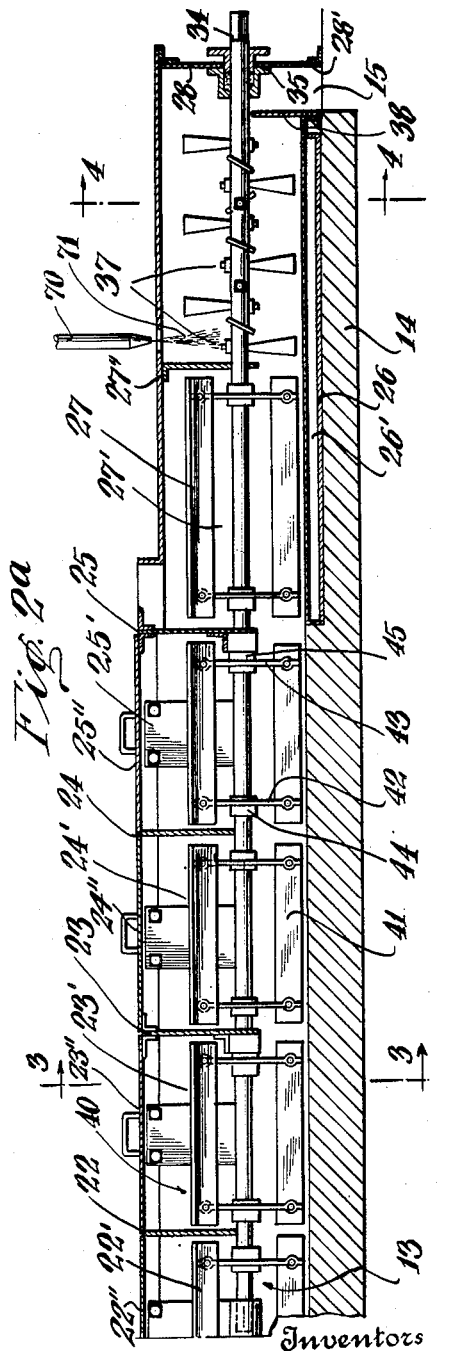

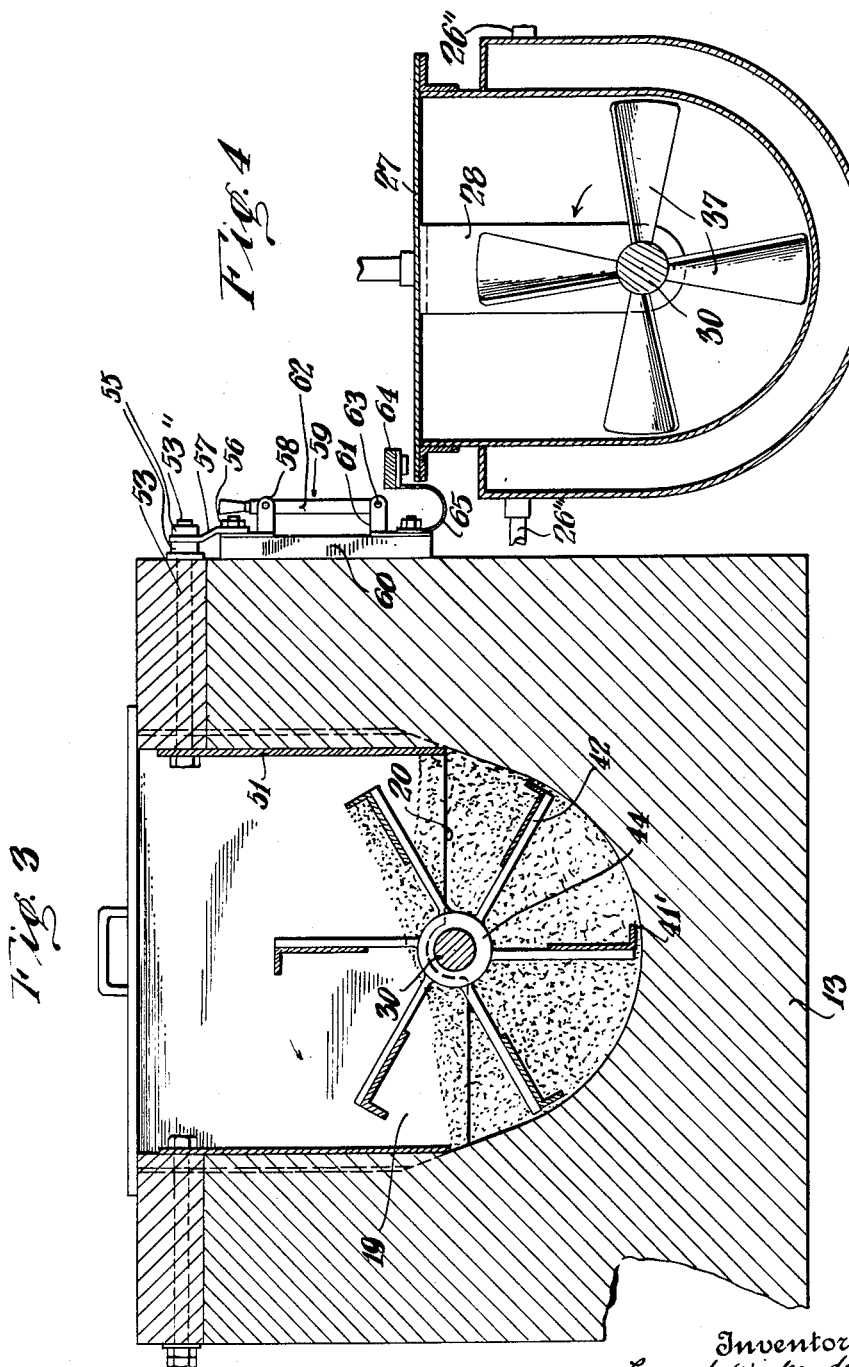

1,854,387

UNITED STATES PATENT OFFICE

LEONARD WICKENDEN, OF MANHASSET, NEW YORK, AND STANLEY A. W. OKELL, OF CRANFORD, NEW JERSEY, ASSIGNORS TO JOHN J. NAUGLE, OF RYE, NEW YORK

APPARATUS FOR THE CONTINUOUS TREATMENT OF COMMINUTED CARBONACEOUS MATERIAL

Application filed January 31, 1928. Serial No. 250,930.

Our present invention relates to apparatus for treating carbonaceous materials, particularly in sub-divided form, especially decolorizing and other activated carbons, in order to revivify the same, if they have been in use, for decolorizing and like purposes, in other words, to restore to the completely or partially spent decolorizing and other activated carbons all, or at least a substantial part, of their original degree of activation, that is, to restore them to their original decolorizing and other purifying powers. While not limited thereto, the apparatus of the present invention is especially applicable to the treatment of decolorizing and like carbons for use in processes for refining sugars, syrups, molasses and other saccharine products. Moreover, while the devices of the present invention are applicable to a large variety of activated carbons of varying compositions and characteristics, they find particularly successful application in the revivification of partially or completely spent decolorizing carbons derived from carbonized lignin residues, for example, the well-known decolorizing carbon sold on the market under the name of "Suchar".

It is an object of the present invention to devise apparatus of the general character specified above which is simple in construction, which may be conveniently and economically fabricated and assembled, and which is highly efficient in operation, being adapted in an expeditious and preferably in a substantially continuous manner to revivify the foregoing materials with a maximum yield and minimum loss in a relatively short time, yielding a revivifying carbon having a degree of activation which compares very favorably with, sometimes equalling and occasionally even exceeding, the original degree of activation of the fresh or virgin carbon. Other objects and advantages of the devices of the present invention will in part be pointed out in detail hereinafter and will in part be obvious to those skilled in the art to which the present invention relates.

In the accompanying specification we shall describe and in the annexed drawings show an illustrative embodiment of the apparatus of the present invention. It is, however, to be clearly understood that our invention is not limited to the specific embodiment thereof herein shown and described for purposes of illustration merely. In the accompanying specification we shall also describe and in the annexed drawings more or less diagrammatically illustrate, several forms of the methods which may be conveniently practiced in the aforesaid illustrative embodiment of the apparatus of the present invention. It is, however, to be clearly understood that said forms of the methods are not limited to their practice in the aforesaid illustrative embodiment of the apparatus of the present invention, nor is such embodiment of the apparatus limited to its use for practicing the aforesaid forms of the methods, such methods forming no part of the present invention but being more fully described and being fully claimed in a copending application of ours filed of even date herewith bearing Serial No. 250,929 and entitled "Methods of revivifying activated carbons and the like".

Referring now to the drawings, wherein we have illustrated the aforesaid illustrative embodiment of the apparatus of the present invention:

Figs. 1 and 1a are top plan views of such apparatus;

Figs. 2 and 2a are longitudinal sectional views of the same taken along line 2—2 of Fig. 1 of the drawings;

Fig. 3 is a cross sectional view of the same taken along line 3—3 of Fig. 2a of the drawings; and Fig. 4 is a cross sectional view of the same taken along line 4—4 of Fig. 2a of the drawings.

Before describing the aforesaid illustrative embodiment of the apparatus of the present invention in detail, it may be desirable to outline the aforesaid forms of methods which may be conveniently practiced in said apparatus. In practicing such forms of the methods we may proceed substantially as follows: The method is designed to give the comminuted carbonaceous material substantially the same treatment as that which is effected according to the issued Patent No.

1,634,479, dated July 5, 1927, entitled "Electric furnace apparatus and process of revivifying decolorizing carbon", in which the desired treatment is effected by the batch method. We prefer, therefore, that the present process shall be carried out substantially continuously, the raw material being fed in at the commencement of the process and the revivified carbon or the like being discharged at the other end of the process in a substantially continuous manner.

The raw material preferably used comprises partially or completely spent decolorizing or other activated carbon. Preferably such carbon is derived from carbonized lignin residues. An example of such a carbon is the highly activated vegetable carbon known on the market as "Suchar". This carbon and the method for making the same are described and claimed in the patent to John J. Naugle, No. 1,701,272, issued February 5, 1929. Accordingly, one form of raw material which may be treated with particular success in accordance with the principles of the methods of the present invention is "Suchar", which has become partially or completely spent in some process where it has served as a decolorizing carbon and otherwise as a purifying agent. One example of such a process is in the refining of raw sugar to make refined sugar. However, "Suchar" which has been used in other branches of the sugar and syrup industry may be treated very successfully in accordance with the method of the present invention, for example, "Suchar" used in the refining of syrups, molasses and other saccharine products.

The "Suchar" or other carbon so used is washed as free as may be from the sugar and other soluble substances which it may contain and will be found to be left with the resinous, coloring, albuminous and other impurities which it has absorbed from the liquids in which it has been used and the absorption of which has deprived it of all or a part, at least, of its original decolorizing and other purifying powers. The moist "Suchar" or other carbon is now dried. While various methods and means may be employed for drying the "Suchar" carbon, we prefer to use the method described and claimed in our copending application filed of even date herewith, bearing Serial No. 250,931 entitled "Methods of drying comminuted carbonaceous materials and the like" and the apparatus described and claimed in our copending application filed of even date herewith, bearing Serial No. 250,932 entitled "Apparatus for drying comminuted carbonaceous materials and the like". This is for the reason that the drying methods and apparatus described and claimed in our two copending applications last referred to are very efficient and will properly dry "Suchar" or other carbon which is ready for the revivifying process now to be described. It may here be stated that the partially or completely spent "Suchar" or other carbon comprises in addition to the original activated carbon the dried coloring, resinous, albuminous and other colloidal and other impurities adhering to or present within the carbon particles.

Our investigations in connection with the various methods of revivifying partially or completely spent decolorizing and other activated carbons, leading up to the methods of the present invention, have demonstrated that the rapidity and completeness of revivification depend on thorough aeration and agitation of the carbon under such conditions that the aeration is substantially uniform and the agitation likewise substantially uniform so that "hot spots" will be avoided in the mass being aerated and agitated, such "hot spots" which result from the usual method of aerating and agitating the carbon, bringing about surface or other local ignition of the carbon, with consequent loss of the carbon, uneconomical utilization of the heat values involved and imperfect revivification for this and other reasons. As the ratio of the carbon-air surface to the total volume of carbon being treated becomes greater as the thickness of the layer of carbon under treatment is made less, it has been found very advantageous to make this layer reasonably shallow. It will, therefore, be apparent that a continuous process, if otherwise satisfactory, as the present process is, lends itself more practically to the treatment of the carbon in shallow layers than does any batch process. This is for the reason, as will be readily apparent, that it is very difficult to completely discharge a shallow layer of hot carbon from the batch process from one central discharge orifice.

In addition to the advantages referred to above resulting from substantially continuous operation and the treatment of the carbon in relatively shallow layers, we have made certain very important discoveries in connection with the factors which should govern the agitation if such agitation is to be in effect and not merely in appearance efficient for the desired purpose. It is, as already stated, highly desirable to thoroughly aerate the carbon by bringing as large a surface of the same in contact with the atmosphere as possible during the revivifying process, as described above. It is, however, necessary that such agitation be so conducted as to prevent any substantial ignition of the carbon at the surface of the carbon mass being treated. We have discovered further that the best temperature for revivification, particularly for the class of carbons specifically referred to above, is between about 700 degrees and about 900 degrees Fahrenheit. The agitation and heating of the carbon being revivified should therefore, be so conducted as to heat the mass of carbon substantially uniformly to the temperature just specified and at the same time to substantially uniformly aerate it. In this way, if the agitation is properly conducted, the carbon will be kept in a black or non-luminous condition due to the fact that the carbon particles themselves are not being consumed, only the carbonized impurities, which ignite at substantially lower temperatures than the particles of activated carbon themselves, being slowly consumed.

This highly desirable condition will be evident by the fact that there will be a minimum of bright spots in the surface of the mass being treated due to the ignition of small particles of carbon. The proper agitation of the mass will, therefore, effectively prevent surface ignition, maintain the entire mass at a substantially uniform temperature best suited for revivification, conserve the heat values needed for the revivification, and otherwise facilitate the revivification so that it will be conducted in the most efficient manner possible.

We have discovered that the following considerations should be carefully kept in mind in the agitation of the mass of carbon being revivified. Contrary to expectations, a too rapid movement of a broad-bladed agitator or its equivalent through the mass of carbon particles produces little agitation of the right sort, the carbon being in a dispersed condition as a result of such rapid movement. Under these conditions the carbon occupies a volume considerably in excess of its volume in the static condition. Under these conditions the carbon occupies a volume considerably in excess of its volume in the static condition. Under these conditions, also, the carbon assumes a more or less liquid-like appearance, flowing like a fluid around the sides of the blade used for the agitation. Due to this condition, the carbon being insufficiently aerated and the heat values therefore being improperly distributed through the mass of the carbon, the substantially stationary particles of carbon become overheated and, being exposed constantly to the air in their overheated and substantially static condition, will burn up. This surface burning tends to increase the temperature of the mass beyond the limits desired, thereby rendering the control of temperature and proper revivification impossible.

We have discovered that if, on the other hand, the blade or other agitating element moves relatively slowly through the mass of carbon being heated and if, in addition, a reasonably sufficient time is allowed to elapse between the passage of one blade and that of the next, the carbon particles will have time to settle by gravity between successive passages of the agitating blades and will become more or less closely packed on the bottom of the apparatus employed. It is the passage of a broad-bladed or similar agitator through the more or less closely packed mass of carbon particles which, so we have discovered, produces ideal agitation, resulting in substantially uniform aeration, substantially uniform heating, and efficient and expeditious revivification. In other words, the movement of the broad blade or paddle serving as the agitating element through the mass of heated carbon should be so timed that the carbon particles have time to settle between successive passages of the agitating element or elements and substantial dispersion of the carbon particles is avoided.

The optimum speed of movement of the agitation element or elements through the mass of carbon particles being heated must in each case be determined by trial and experiment. Suffice it to say that in the case which we have observed and as described more in detail later in this specification, a rate of rotation of the shaft carrying the broad blades or paddles serving as the agitating means in the illustrative form of apparatus described later in this specification equal to about one revolution of the shaft in about 45 seconds, or even in one minute, where there are six blades in each series will, under certain conditions, produce the best results. This is a rate of rotation which is a small fraction of that hitherto employed and deemed desirable and necessary for the best revivifying results. Such a rate of rotation, or its equivalent, depending on the characteristics of the apparatus being employed, and constituting in any event a fraction of the usual rate of rotation, produces unexpected results of great practical and theoretical importance. Far from diminishing the efficiency of the revivifying process, such slow rate of agitation brings about substantially uniform aeration, substantially uniform heating and substantially uniform agitation, with consequent avoidance of the dispersion effects referred to above and the substantial avoidance also of hot spots and resulting surface and other local ignition which wastes carbon, interferes with proper revivification and renders very difficult proper temperature control.

Since the process of the present invention is preferably, if not necessarily, conducted in a continuous manner, which requires a considerable length of travel of the material from the inlet to the outlet end of the process, and since such a considerable length of travel would tend to produce drafts of air over the surface of the carbon being treated, which drafts of air would tend to cause surface ignition and to undesirably move the material under treatment, we prefer to break up this rather long current of air by the interposition of spaced baffles or the like. We prefer also that such baffles or the like shall be so arranged as to substantially prevent any movement of the material under treatment in a direction opposite to that in which it is desired it shall move during the treatment.

One further and very important feature of the present invention is that by means of the methods of the present invention, we are enabled to interrupt the process at any time desired without losing the material in the apparatus at the time of the interruption of the process. Hitherto the continuous revivification of carbon, as distinguished from the batch or discontinuous methods of revivification, has been deemed undesirable for the reason that when the process is interrupted, the highly heated carbon present in the apparatus at the time of such interruption would, upon the interruption of the process, generally ignite, thus bringing about considerable fire hazards and resulting in the loss of considerable carbon. We avoid the undesirable consequences of the usual processes for the revivification of carbon in a substantially continuous manner by having the agitation of the heated carbon mass continued in the manner described above even after the actual progress of the heating and revivifying operations is interrupted, until the mass of carbon is thoroughly cooled. We have discovered that such agitation conducted at the relatively low rates of speed described above produces the unexpected result of cooling the mass of carbon relatively rapidly and at the same time avoiding ignition and other losses of the heated material in the apparatus at the time the actual revivification process is interrupted. This cooling effect is due to the peculiar method of agitation which we employ which tends to continuously prevent any incipient surface ignition by smothering it with carbon from the lower layers.

The time of treatment in accordance with the principles of the methods of the present invention will generally be from about two to about three hours, depending upon the composition of the original carbon and the character of the impurities which it has absorbed during its use. The revivified carbon leaving at the exit end of the process may be quenched in water or otherwise permitted to cool. We may, for example, moisten the revivified carbon in the manner described and claimed in our two copending applications filed of even date herewith and respectively entitled "Methods of preparing activated carbons and the like" bearing Serial No. 250,933 and "Activated carbons and the like" bearing Serial No. 250,934. The carbon is now ready for use.

This completes the description of the aforesaid form of the methods which may be conveniently practiced in the aforesaid illustrative embodiment of the apparatus of the present invention.

Referring now more particularly to the apparatus itself, and with particular reference to the drawings illustrating the same, 10 indicates a trough of general elongated form made of firebrick or other suitable refractory material. 11 indicates the inlet to the trough 10 through which the material, such as the spent decolorizing carbon, for example, to be treated in the apparatus being described may be fed into such apparatus. The inlet 11 is in an inlet section 12 of the trough 10, the inlet section 12 preferably having higher walls and being of greater depth than the remaining portion of the trough 10. The reason for this arrangement is that during the early stages of treatment large volumes of gases are evolved owing to the dry distillation of the impurities in the carbon, resulting in some dusting and the extra space is allowed for the dust to settle. Further, it is found advantageous to cover this part of the trough with some suitable filtering material which will permit the passage of the gases and prevent the escape of carbon particles, the extra height at this part minimizing the chances of the filtering material, if cloth is used, becoming ignited.

13 indicates the intermediate section of the trough 10, this intermediate section being of lesser depth and the walls of the same being of lesser height than in the case of the inlet section 12, since by the time the spent decolorizing carbon reaches the intermediate section 13 of the trough 10 it will be properly distributed and the height of such section 13 will be sufficient. 14 indicates the outlet portion of the trough provided with an outlet 15 through which the treated material may be discharged in the dry revivified condition into a pit or other suitable receptacle.

The first section 12 of the trough 10 is divided into three sub-sections by means of the baffles generally designed by reference characters 16, 17 and 18. There is thus provided a series of preliminary heating and treating compartments 16′, 17′ and 18′ defined by the baffles 16, 17 and 18, respectively, in cooperation with the walls of the brickwork making up the inlet section 12 of the trough 10. Since the baffles 16, 17 and 18 and the other baffles subsequently described in this specification are of substantially the same shape and form, it will be necessary only to describe a single one of said baffles. These baffles, which are suitably supported in the brickwork making up the trough, are of substantially rectangular form except that each baffle preferably has a lower portion 19 and a cutaway portion 20. The reason for this is that the operation of the paddles or stirring members subsequently described in the direction of the arrow in the drawings, Fig. 3, elevates the material being treated substantially to the position corresponding to the cutaway portion 20 adjacent one side of the paddles and will lower the level of such material substantially to the position occupied by the lower portion 19 of the paddles. Accordingly, by providing the cutaway portion 20, the material under treatment may be fed more conveniently and at greater speed through the apparatus.

It may here be stated that another purpose of the baffles is to break up the current of air which would otherwise flow from one end to the other of the trough, with consequent loss of material being treated due to surface ignition. The baffles have the further function of preventing any substantial amount of material from falling back during the stirring operation and thus from being treated more than is desirable. In other words, the baffles serve to render the device more uniform and regular in its operation and to prevent loss of material due to combustion.

The intermediate section 13 of the trough 10 is divided into five sub-sections by means of the baffles 21, 22, 23, 24 and 25, the sections themselves being designated by reference characters 21', 22', 23', 24' and 25' and being defined by the baffles 21, 22, 23, 24 and 25, respectively, in association with the portions of the brickwork making up the trough.

The final or outlet section 14 of the trough 10 is preferably provided with the outer wall 26 defining a space 26' which may be used as a water jacket for cooling purposes. 26" indicates the inlet and 26''' indicates the outlet pipe coupling for the water jacket 26'. 27 indicates a cover which may be applied to the outlet trough section 14.

We provide means for stirring the mass of material undergoing treatment in the trough 10 in such a manner that the material being stirred will be stirred substantially uniformly and will be maintained at a substantially uniform temperature throughout its entire mass. While various means may be employed for this purpose, we prefer to utilize the means shown in the comprising, preferably, a plurality of series of paddles shortly to be described. We prefer also to provide means for rotating such series of paddles at a relatively low rate of speed, since we have found that high rates of speed of rotation, corresponding to rapid stirring of the material, instead of increasing the efficiency of the device diminish it. As already pointed out, such high speeds of rotation corresponding to high rates of stirring, disperse the material and reduce it somewhat to a liquid-like condition in which stagnant portions of the material are brought about which facilitate surface ignition and prevent uniform distribution of temperature and thus prevent uniform operation of the revivification process.

We prefer also that the stirring means shall be provided with or shall also constitute means for advancing the material through the trough 10 during the course of treatment. While various means may be employed for this purpose, we prefer to utilize the means illustrated in the drawings. Such means comprises a shaft 30 which preferably runs from one end to the other of the trough 10. The shaft 30 is provided with suitable bearings, one of which may be in the inlet end wall 29 of the trough 10 and is generally designated by reference character 31. 32 indicates a pulley which is attached to the shaft 30 and by means of which the same may be rotated in the manner already described. 33 indicates a packing of asbestos rope or the like surrounding that portion of the shaft 30 which is within the inlet end wall 29 embodying the bearing 31. The other end 34 of the shaft 30 is supported in the outlet end wall 28 which is provided with a gland or stuffing box 35.

At 36 we have indicated a plurality of adjustable paddles for initially stirring the mass of granular or other spent decolorizing carbon or the like as it enters the trough through the inlet 11 in order to stir the mass up so that the same will be properly fed onto the series of stirring paddles now to be described. We have shown a series of stirring paddles corresponding to the number of compartments 16', 17', 18', 21', 22', 23', 24' and 25' into which the sections 12 and 13 of the trough 10 have been divided. There is also an additional series of stirring paddles 37 in the end section 14 of the trough 10, this portion of the outlet end of the trough being designated by reference character 27', there being also provided a baffle 37" defining the said section 27'.

It may here be stated that any number of initial stirring paddles 36 may be employed for preliminarily stirring the material as it is fed towards the stirring paddles shortly to be described in detail. It may here also be stated that we provide a second series of adjustable mixing paddles 37 at the outlet end of the device in order to stir the material and thoroughly mix and cool the same as it approaches the outlet 15, said outlet having a raised portion 38 which cooperates with a lower portion 28' of the outlet end wall to define the outlet 15. The portion 38 acts in the nature of a baffle to prevent the discharge of material except above its upper edge through the outlet 15.

Referring now to the paddles with which each of the described sections of the trough 10 has been provided, each series of paddles, generally designated by reference character 40, comprises a plurality of, here shown as six, blades or paddles 41 of general elongated form and of substantially L-shaped cross section. The paddles or blades 41 are each supported by a plurality of arms 42 and 43 secured to sleeves 44 and 45, respectively, carried by the appropriate portion of the shaft 30. It may here be stated that in order that the series of paddles 40 shall also serve to feed the material from the inlet towards the outlet end of the trough, some or all of the paddles may be bent slightly so as to give them a somewhat spiral form, as will readily be apparent to those skilled in the art to which the present invention relates. It may here be stated that the blades 41 may be secured to the arms 42 and 43 by bolts or any other suitable fastening means. It may here also be stated that the arms 42 and 43 may be secured to the sleeves 44 and 45 carried by the shaft 30 in any suitable manner, as will be readily apparent to those skilled in the art to which the present invention relates.

We provide suitable means for heating the granular spent decolorizing carbon or other material being treated in the apparatus during its passage through such apparatus. While various means may be employed for this purpose, we prefer to employ electrical heating means, preferably heating electrodes by means of which current of the desired intensity is passed directly through the material itself undergoing treatment. We prefer also that the heating effect shall be graduated, that is, that more current, corresponding to a greater heating intensity, shall be applied in the initial stages than in the later stages of the passage of the material undergoing treatment through the apparatus.

While various arrangements may be employed which will carry this idea into effect, we prefer to employ the arrangement illustrated in the drawings and comprising the following structural features: In compartment 16' we employ three pairs, and in compartment 17' we employ two pairs, while in compartment 18' we employ but one pair, of cooperating heating electrodes, these three compartments making up the inlet section 12 of the trough 10. In this way greater heat intensity is brought about in the first compartment, namely the compartment 16', than in the second compartment, namely the compartment 17', and greater heat intensity is brought about in the last-mentioned compartment than in the following compartment, namely compartment 18'. In the remaining compartments, namely 21', 22', 23', 24' and 25' but a single pair of heating electrodes in each compartment is preferably employed, by means of which sufficient heat may be supplied to replace heat values lost by radiation and to supply the heat required for the revivification operation.

Since each pair of heating electrodes is substantially the same as the other pairs of heating electrodes, except that their dimensions may vary slightly in actual practice, it will be sufficient to describe but a single pair of such heating electrodes. As clearly shown in Fig. 2 of the drawings, each pair of heating electrodes, generally designated by reference character 50, comprises a pair of oppositely disposed electrode plates 51 of substantially rectangular form positioned on oppositely disposed portions of the lateral or vertical walls of the trough 10. The electrode plates 51 are preferably held in position by means of the electrically conductive rods 52 and 53 which pass through the upper ends of the corresponding electrode plates 51, being secured thereon by means of the heads 52' and 53' on the rods 52 and 53, respectively. We prefer that the rods 52 and 53 shall be in the nature of bolts having the heads 52' and 53', respectively, and shall have their outer ends 52" and 53" threaded to receive the threaded washers 54 and 55, respectively. In this way the bolts or rods 52 and 53 will be securely positioned and will in turn serve to securely position, the corresponding electrode plates 51. It may here be stated that the rods or bolts 52 and 53 pass through the brickwork constituting the sides or lateral walls of the trough 10.

We provide the electrodes 50 with means for their proper electrical connection with the source of supply of electrical energy which is to bring about the desired heating effect. While various means may be utilized for this purpose, we prefer to use the means illustrated in the drawings and comprising a threaded nut 56 carried by the threaded end of that one of the rods or bolts, such as the rod or bolt 53, by means of which connection is to be made with the source of supply of electrical energy. Interposed between the threaded nut 56 and the correspondingly threaded washer 55, both carried by the threaded end 53" of the rod or bolt 53, is a connector 57 which leads to one pole 58 of a switch generally designated by reference character 59, the operative parts of which are mounted on a slate or other insulating support 60 carried by the brickwork of the trough 10. The contact 58, which may be the forked spring contact of a knife switch, is pivoted, as at 63. 64 indicates a bus bar which is connected by means of the connector 65 with the contact 61 of the knife switch 59.

It may here be stated that the provision of the separate series of paddles 40 and the interposition of the various baffles between successive series of paddles, permits the introduction of thermometers and other controlling and regulating devices by means of which the progress of the operation of the apparatus may be determined and other factors of such operation properly controlled. It may here further be stated that any suitable driving mechanism for the shaft 30 and the various parts carried thereby and rotatably mounted thereon may be provided, which driving mechanism is not deemed here necessary to be shown. It is sufficient to state, however, that such driving mechanism may, for example, include reduction gear mechanism or any other device or mechanism which will permit the speed of rotation of the shaft 30 and the parts carried thereby to be controlled so as to bring such speed of rotation within the limits suitable for optimum operation, such speed of rotation being within the limits of the low speeds referred to earlier in this specification.

This completes the description of the aforesaid illustrative embodiment of the apparatus of the present invention. The construction of said form of apparatus and the manner of assembling the same will, it is believed, be clear from the foregoing description. Likewise the mode of operation of said form of apparatus will be clear from the foregoing description but may be briefly summarized as follows:

Assuming that the shaft 30 with the paddles 40 carried thereby revolves at a rate of speed, for example, one revolution in from about 45 seconds to about a minute, in the direction of the arrows appearing in Figs. 3 and 4 of the drawings, which rate of speed has been determined in advance as being the rate of speed most suitable for the best results, it will be found that the paddles 41, having the raised lips or edges 41', will pick the carbon up gently and stir it in the desired manner, the rate of rotation being such as to prevent any substantial dispersion of the carbon and being such as to permit it to become substantially settled or packed between successive impacts of the paddles 41. As the carbon is picked up by the paddles 41, assisted by the raised edges or marginal portions 41' with which such paddles are provided, it slides down through the spaces around the shaft, this slow tumbling action thoroughly and uniformly agitating and aerating the heated carbon.

It will be noted that this arrangement practically insures that there will at all times be a maximum amount of carbon surface presented to the air. This is for the reason that when the carbon is lifted by the particular paddle 41 and the associated lip 41' portion there is a carbon-air surface both above and below the particular paddle. Since it is one of the objects of the present invention to keep the carbon uniformly heated at a suitable temperature, for example, between about 700 degrees and about 900 degrees F. in the case of spent "Suchar" or like activated carbon derived from carbonized lignin residues and like carbonaceous material, without permitting such material to ignite, and as the slightest draft tends to cause considerable surface ignition, by which we mean a temperature at the surface of the carbon particles higher than that of the main body of the carbonaceous material below the surface, which temperature is generally sufficient to cause actual ignition, we have provided the baffle plates already described above as being disposed at suitable intervals along the length of the trough to prevent such longitudinal currents of air. As already indicated, these baffle plates extend to about the same depth as the center line of the shaft and as the carbon layer covers the shaft, it will readily be understood that the trough is thereby divided into a series of compartments, the carbon being fed along beneath the baffle plates. When the trough is covered by means of any suitable cover or lid, or series of covers or lids, each compartment of the trough may be more or less hermetically sealed from the adjacent compartment or compartments and from the surrounding air. It may here be stated that the baffle plates not only prevent longitudinal currents of air but also prevent any tendency of the carbonaceous material undergoing treatment from "end-to-end" mixing and thus help to insure that all of the carbon particles undergoing treatment will proceed at a substantially uniform rate of speed through the trough and will thus be uniformly heated and otherwise uniformly treated.

As already specified above, one of the main objections to a continuous process for the treatment of carbonaceous material for activating the same, for example, has been the difficulty of saving the valuable contents of the apparatus from loss by burning if, for any reason accidentally or intentially, such apparatus has to be temporarily shut down. This loss has been eliminated due to the fact that the mixing paddles 37 may be slowly rotated to prevent the loss of the carbon content of the apparatus due to its slowly burning up after the apparatus has been shut down.

With the arrangement of compartments described above, including the covers or lids which may be applied to the various compartments for more or less hermetically sealing the same from each other and from the surrounding air, coupled with the slow stirring of the carbon described above for the treatment of the carbon itself to revivify the same, not only may the temperature at which the carbon is being heated be regulated and kept under complete control at all times, but in the event of the shutting down the apparatus, it is necessary merely to shut off the electric current, cover the trough and by allowing the agitator to revolve within the limits of speeds already described above, completely extinguish any tendency of the material in the trough to catch fire, the whole contents of the apparatus being gradually cooled to room temperature, if desired, or to any other suitable temperature in a very short time, generally only a few hours where the material is to be cooled to room temperature.

It may here be stated that the covers for the section 21', 22', 23', 24' and 25' of the intermediate stage or section of the apparatus, corresponding to the intermediate stages of the revivification process, have been designated respectively by reference characters 21'', 22'', 23'', 24'' and 25'', each of these covers being provided with a handle of any usual or desired construction to permit the convenient manipulation of the cover into the desired adjusted position, either completely or partially closed, or to remove the cover entirely. With reference to the cover 27 for the last or cooling and discharge section of the apparatus, corresponding to the cooling, moistening and discharge stages of the process, this cover may similarly be manipulated into adjusted position or removed by means of suitable disposed handles.

In order to assist in cooling the revivified material and also to avoid excessive "dusting", which would result if the carbon were discharge from the machine, after cooling, in a very dry condition, we provide means, such as a spray pipe 70, for discharging a fine spray 71 of water or like inert moistening fluid onto the revivified carbon as the same is manipulated by the stirring paddles 37 towards the outlet 15 of the machine. These paddles serve also to distribute the moisture more or less evenly through the mass of carbon in the last section of the apparatus.

In summarizing the operation of the apparatus, it will be noted that the apparatus consists essentially of three principal portions or sections: namely, the first or dry distillation section 12; the intermediate or activating section 13; and the final or cooling, moistening and discharge section 14. In the first section the carbonaceous impurities which the carbon has absorbed during its use are subjected to a process of "dry distillation" which serves to carbonize such impurities. In the second section the carbonized impurities are burnt away by a process of slow combustion with a minimum combustion of the carbon particles themselves. In the third section the reactivated and revivified carbon is cooled, moistened and discharged from the apparatus.

This completes the description of the mode of operation of the aforesaid illustrative embodiment of the apparatus of the present invention. It will be noted that such apparatus is simple in construction and may be readily, conveniently and economically fabricated, assembled and operated. In operation the device is very efficient, permitting the continuous revivification of the activated carbon in the most expeditious manner with maximum yields of a highly activated carbon. By means of the apparatus of the present invention it is also possible to interrupt the operation of the apparatus without endangering the contents of the apparatus at the time the operation is interrupted, whether such interruption is accidental or intentional. Other superiorities and advantages of the apparatus of the present invention as exemplified in the aforesaid illustrative embodiment of the same will readily occur to those skilled in the art to which the present invention relates.

It may here be stated that instead of passing the current through the material to be treated in a transverse direction between pairs of opposed electrodes, the heating current may be passed longitudinally through the apparatus, as between successive baffles. Under certain conditions the longitudinal, as distinguished from the transverse, passage of the electric current, may possess certain advantages and economies in operation.

What we claim as our invention is:

1. In an apparatus for the continuous treatment of comminuted carbonaceous material and the like, a trough of general elongated form and a plurality of pairs of heating electrodes disposed along the inner walls of said trough, in combination with means comprising a plurality of broad bladed paddles mounted for rotation within said trough about an axis extending substantially longitudinally of said trough for stirring said material and for advancing the same through said trough.

2. In an apparatus for the continuous treatment of comminuted carbonaceous material and the like, a trough of general elongated form and a plurality of pairs of heating electrodes disposed along the inner walls of said trough, the electrodes of each pair being substantially parallelly disposed with respect to each other and substantially normally to the line of general longitudinal extent of said trough, in combination with means comprising a plurality of broad bladed paddles mounted for rotation within said trough about an axis extending substantially longitudinally of said trough for stirring said material and for advancing the same through said trough.

3. In an apparatus for the continuous treatment of comminuted carbonaceous material and the like, a trough of general elongated form and a plurality of pairs of heating electrodes disposed along the inner walls of said trough, the electrodes of each pair being substantially parallelly disposed with respect to each other, in combination with means comprising a plurality of broad bladed paddles mounted for rotation within said trough about an axis extending substantially longitudinally of said trough for stirring said material and for advancing the same through said trough.

4. In an apparatus for the continuous treatment of comminuted carbonaceous material and the like, a trough of general elongated form and a plurality of pairs of heating electrodes disposed along the inner walls of said trough substantially normally to the line of general longitudinal extent of said trough, in combination with means comprising a plurality of broad bladed paddles mounted for rotation within said trough about an axis extending substantially longitudinally of said trough for stirring said material and for advancing the same through said trough.

5. In an apparatus for the continuous treatment of comminuted carbonaceous material and the like, a trough of general elongated form and a plurality of pairs of heating electrodes disposed along the inner walls of said trough, in combination with means comprising a plurality of spaced series of paddles of substantially L-shaped cross-section mounted for rotation within said trough about an axis extending substantially longitudinally of said trough and for stirring said material and for advancing the same through said trough, and means for rotating said series of paddles at a relatively low rate of speed.

6. In an apparatus for the continuous treatment of comminuted carbonaceous material and the like, a trough of general elongated form and a plurality of pairs of heating electrodes disposed along the inner walls of said trough, the electrodes of each pair being substantially parallelly disposed with respect to each other and substantially normally to the line of general longitudinal extent of said trough, in combination with means comprising a plurality of spaced series of paddles of substantially L-shaped cross-section mounted for rotation within said trough about an axis extending substantially longitudinally of said trough and for stirring said material and for advancing the same through said trough, and means for rotating said series of paddles at a relatively low rate of speed.

7. In an apparatus for the continuous treatment of comminuted carbonaceous material and the like, a trough of general elongated form and a plurality of pairs of heating electrodes disposed along the inner walls of said trough, the electrodes of each pair being substantially parallelly disposed with respect to each other, in combination with means comprising a plurality of spaced series of paddles of substantially L-shaped cross-section mounted for rotation within said trough about an axis extending substantially longitudinally of said trough and for stirring said material and for advancing the same through said trough, and means for rotating said series of paddles at a relatively low rate of speed.

8. In an apparatus for the continuous treatment of comminuted carbonaceous material and the like, a trough of general elongated form and a plurality of pairs of heating electrodes disposed along the inner walls of said trough substantially normally to the line of general longitudinal extent of said trough, in combination with means comprising a plurality of spaced series of paddles of substantially L-shaped cross-section mounted for rotation within said trough about an axis extending substantially longitudinally of said trough and for stirring said material and for advancing the same through said trough, and means for rotating said series of paddles at a relatively low rate of speed.

9. In an apparatus for the continuous treatment of comminuted carbonaceous material and the like, a trough of general elongated form and a plurality of pairs of heating electrodes disposed along the inner walls of said trough, in combination with means comprising a plurality of spaced series of paddles of substantially L-shaped cross-section mounted for rotation within said trough about an axis extending substantially longitudinally of said trough and for stirring said material and for advancing the same through said trough, means comprising a plurality of baffles positioned intermediate successive series of paddles for preventing undesirable currents of air longitudinally of said trough and means for rotating said series of paddles at a relatively low rate of speed.

10. In an apparatus for the continuous treatment of comminuted carbonaceous material and the like, a trough of general elongated form and a plurality of pairs of heating electrodes disposed along the inner walls of said trough, the electrodes of each pair being substantially parallelly disposed with respect to each other and substantially normally to the line of general longitudinal extent of said trough, in combination with means comprising a plurality of spaced series of paddles of substantially L-shaped cross-section mounted for rotation within said trough about an axis extending substantially longitudinally of said trough and for stirring said material and for advancing the same through said trough, means comprising a plurality of baffles positioned intermediate successive series of paddles for preventing undesirable currents of air longitudinally of said trough and means for rotating said series of paddles at a relatively low rate of speed.

In testimony whereof, we have signed our names to this specification this 31st day of December, 1927.

LEONARD WICKENDEN.
STANLEY A. W. OKELL.